(12) United States Patent
Weissenborn et al.

(10) Patent No.: US 10,079,094 B2
(45) Date of Patent: Sep. 18, 2018

(54) CAPACITOR, IN PARTICULAR AN INTERMEDIATE CIRCUIT CAPACITOR FOR A MULTI-PHASE SYSTEM

(71) Applicant: Robert Bosch GmbH, Stuttgart (DE)

(72) Inventors: Erik Weissenborn, Stuttgart (DE); Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 15/249,990

(22) Filed: Aug. 29, 2016

(65) Prior Publication Data

US 2017/0062132 A1 Mar. 2, 2017

(30) Foreign Application Priority Data

Sep. 2, 2015 (DE) .................. 10 2015 216 771

(51) Int. Cl.
*H01G 4/228* (2006.01)
*H01G 4/005* (2006.01)
*H01G 4/38* (2006.01)
*H01G 4/40* (2006.01)
*H01G 4/012* (2006.01)

(52) U.S. Cl.
CPC ............. *H01G 4/005* (2013.01); *H01G 4/012* (2013.01); *H01G 4/228* (2013.01); *H01G 4/385* (2013.01); *H01G 4/40* (2013.01)

(58) Field of Classification Search
CPC ...................................................... H01G 4/228
See application file for complete search history.

(56) References Cited

U.S. PATENT DOCUMENTS

| 2013/0033913 A1* | 2/2013 | Sparka ................. H01G 4/228 363/132 |
| 2013/0308351 A1 | 11/2013 | MacLennan |
| 2017/0256361 A1* | 9/2017 | Yang ....................... H01G 4/33 |

FOREIGN PATENT DOCUMENTS

| DE | 102009055376 A1 | 6/2011 |
| DE | 102011007315 A1 | 10/2012 |
| WO | 2014037168 | 3/2014 |

* cited by examiner

*Primary Examiner* — Eric Thomas
(74) *Attorney, Agent, or Firm* — Michael Best & Friedrich LLP

(57) ABSTRACT

A capacitor (1) wherein the first voltage layer (11) and the second voltage layer (21) form an overlap region (4) in which the first voltage layer (11) and the second voltage layer (21) are arranged parallel to one another, separated by a gap (5), on a base side (6) of the capacitor (1), directly above one another, and wherein the at least one first pole terminal (12) extends in lateral continuation of the first voltage layer (11) and, in parallel with this, the at least one second pole terminal (22) extends in lateral continuation of the second voltage layer (21) over and beyond the overlap region (4), and in this way form at least one contact lug pair (7) protruding from the base side (6) of the capacitor (1).

18 Claims, 3 Drawing Sheets

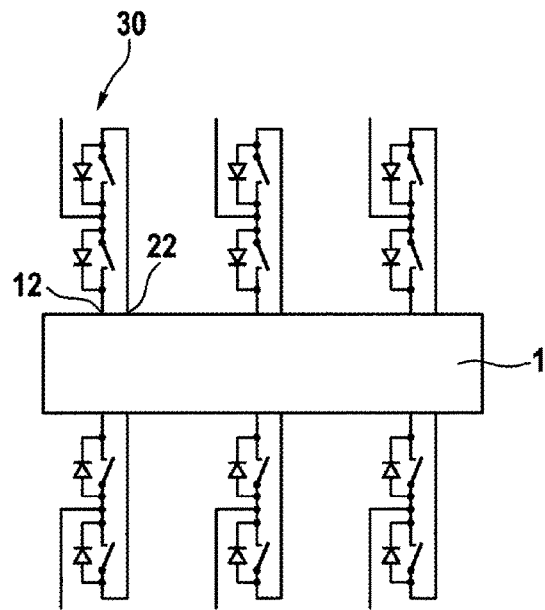
FIG. 3
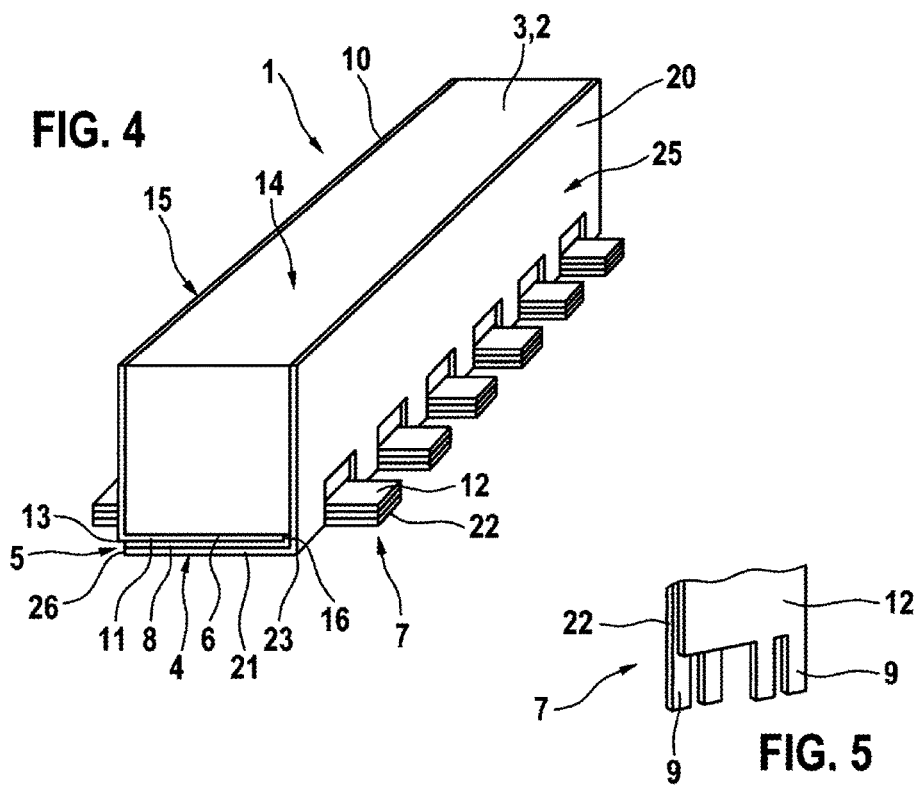
FIG. 4
FIG. 5

CAPACITOR, IN PARTICULAR AN INTERMEDIATE CIRCUIT CAPACITOR FOR A MULTI-PHASE SYSTEM

BACKGROUND OF THE INVENTION

The invention relates to a capacitor, in particular an intermediate circuit capacitor for a multi-phase system.

In power electronics multiple electrical networks are energetically coupled to a common DC voltage level by converters through electrical capacitors in an intermediate circuit. As a result of the repeated occurrence of switching processes, high, frequency-dependent power losses result from the changing currents in the phases. It is known that through planar current carriers, and through the magnetic interaction between the current-carrying layers with opposing current directions, a significant reduction in the inductance resulting from the interconnection results, and thereby significantly reduced power losses.

Document WO 2014/037168 A1 indicates an electrical energy storage cell with a large number of planar anode foils and a large number of planar cathode foils with alternately angled voltage layers, in which the total inductance is reduced by the planar current carriers in voltage layers positioned one above another.

SUMMARY OF THE INVENTION

According to the invention, a capacitor, in particular an intermediate circuit capacitor for a multi-phase system, is proposed. This comprises a first planar electrode and a second planar electrode located opposite it at a distance, and at least one capacitor structure comprising at least one dielectric inserted between the first planar electrode and the second planar electrode, and a first voltage layer bent at an angle to the first planar electrode and a second voltage layer bent at an angle to the second planar electrode, and at least one first pole terminal for contacting the first voltage layer and at least one second pole terminal for contacting the second voltage layer. According to the invention, the first voltage layer and the second voltage layer of the capacitor form an overlap region in which the first voltage layer and the second voltage layer are arranged parallel to one another, separated by a gap, on a base side of the capacitor, directly above one another. According to the invention, the at least one first pole terminal extends in lateral continuation of the first voltage layer and, in parallel with this, the at least one second pole terminal extends in lateral continuation of the second voltage layer over and beyond the overlap region, and in this way form at least one contact lug pair protruding from the base side of the capacitor.

In contrast to the prior art, the capacitor of the invention has the advantage that the first voltage layer and the second voltage layer of the capacitor form an overlap region in which the voltage layers are located one above another. Pole terminals are furthermore formed on the voltage layers in lateral continuation of the voltage layers. Through the plane-parallel arrangement of the areas and the opposing current direction, the current paths in the voltage layers are located close to one another. The effects caused in conductors positioned close to one another through magnetic coupling of the magnetic fields, which can lead to large losses, are advantageously compensated for through the current paths being arranged above one another with opposing current directions. Through this advantageous low-inductance construction technique, the total inductance is greatly reduced, which leads to advantageously low losses. The arrangement of the voltage layers and the planar electrodes of the capacitor according to the invention permits the minimization of inductance and losses in the capacitor. Contributions to the loss from the electrodes, the pole interconnection and the arrangement of the electrodes, as well as skin effects and proximity effects, are reduced by the capacitor according to the invention. Skin effects have the effect that the current density in the interior of electrical conductors through which alternating current is flowing is lower than it is in the outer regions. Proximity effects result in necking or squeezing of current between the closely positioned conductors of alternating currents. In addition to this, the electromagnetic compatibility of the structure with respect to other components is advantageously improved. The capacitor according to the invention, moreover, can advantageously be employed as a multi-phase capacitor in intermediate circuits. Thus for example, all the phases of a 6-phase system can be connected to the capacitor according to the invention, instead of having to connect two 3-phase capacitors via a busbar, which even at very low values of inductance can lead to potentially oscillating CLC systems, in which an inverter phase is excited at every switching process. Since with the capacitor according to the invention the polarity of all the phase terminals is maintained, all of the terminals can be implemented in pairs in the same way. The planar structure of the planar electrodes and of the voltage layers furthermore yields an advantageous cross-section for reducing the influence of the skin effect, so that the capacitor according to the invention exhibits an advantageously reduced loss resistance.

It is found to be particularly advantageous if the first planar electrode and the second planar electrode and the voltage layers arranged at the base side of the capacitor form in cross-section an enclosure for the capacitor structure. The capacitor structure can thus be inserted into the enclosure, and in this way advantageously adjusted and protected. If the capacitor structure consists, for example, of a plurality of individual capacitors, these can advantageously be arranged in the enclosure, and for example advantageously easily be contacted and joined by the planar electrodes.

In a particularly advantageous exemplary embodiment, the pole terminals are designed on edges formed by the planar electrodes and the voltage layers. A particularly simple manufacture of the pole terminals is ensured in this way, being for example cut from the material before bending the edge. In addition, pole terminals arranged at the edges can advantageously be contacted both with further components arranged at the sides of the capacitor as well as with components arranged underneath the capacitor.

If an opening is arranged in the second planar electrode and/or in the second voltage layer, the first voltage layer can particularly advantageously be arranged with respect to the second voltage layer such that the first pole terminal protrudes through the opening of the second voltage layer. The voltage layers and the planar electrodes can thus be arranged particularly advantageously in a compact form, and the overlap region between the first voltage layer and the second voltage layer can advantageously be designed to be maximum. Thus both the first pole terminals and the second pole terminals can advantageously easily be contacted from outside.

In a particularly advantageous exemplary embodiment, the planar electrodes, together with the respective voltage layers, exhibit, in cross-section, an L-shaped profile. A U-profile thus resulting from the two interleaved L-profiles is advantageously compact, and offers an advantageous enclosure for a large number of standard capacitors, and thus proves to be particularly advantageous in applications that require a connection of a plurality of capacitors.

It is found to be of advantage if in one contact lug pair, the first pole terminals are arranged directly above or directly underneath the second pole terminals. The current paths are thus positioned in parallel over a larger area, and losses in the capacitor are thus further reduced.

Advantageously, the first pole terminal and the second pole terminal have the same surface area. An optimized positioning of the current paths over one another up to the pole terminals is thus ensured, the total inductance is reduced, and the electromagnetic compatibility is improved.

It is found to be particularly advantageous if the pole terminals are formed in the planes of extension of the respectively associated planar electrodes or voltage layers. This permits a simple and economical manufacture of the capacitor according to the invention, and has in addition the advantage that the pole terminals are attached at easily accessible positions of the capacitor, and can easily be contacted electrically.

In particularly advantageous exemplary embodiments, in addition to the at least one first pole terminal and the at least one second pole terminal, further first and second pole terminals of the same type are provided, which form in respective pairs further contact lug pairs, wherein the total number of pole terminals is in particular a multiple of three, five or six. These exemplary embodiments represent capacitors with three, five, six or more phase terminals, so that they can be applied in many applications, for example advantageously as intermediate circuit capacitors.

Advantageously an insulation layer of an electrically insulating material is arranged in the capacitor in the gap between the first voltage layer and the second voltage layer. The first voltage layer is thus advantageously electrically insulated from the second voltage layer. In order to arrange for the magnetic interaction between the voltage layers to be as effective as possible, the distance between the voltage layers is kept as small as possible. The insulation layer can for this purpose for example also act as a spacer between the first voltage layer and the second voltage layer.

Contact tabs can particularly advantageously be formed at the pole terminals, having the advantage that they greatly ease an electrical connection of the phases to the pole terminals.

BRIEF DESCRIPTION OF THE DRAWINGS

Exemplary embodiments of the invention are illustrated in the drawing, and are explained in more detail in the following description. Here FIG. 3 shows a schematic illustration of the circuit of phase terminals at the first exemplary embodiment of the capacitor according to the invention, FIG. 4 shows a schematic illustration of a second exemplary embodiment of the capacitor according to the invention, FIG. 5 shows a detailed view of an exemplary embodiment of the pole terminals.

DETAILED DESCRIPTION

Figure 1:
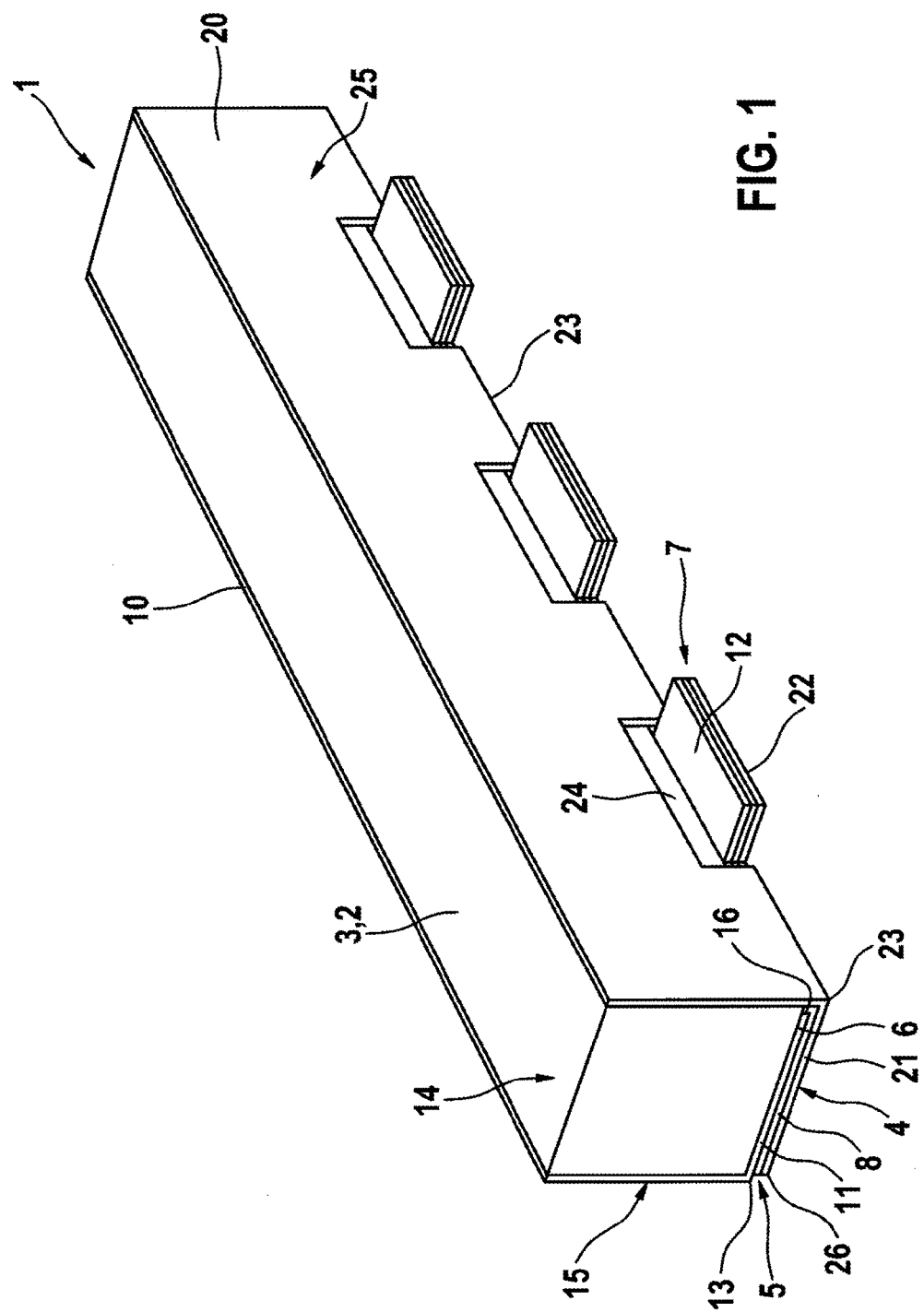
FIG. 1 shows a schematic illustration of a first exemplary embodiment of the capacitor according to the invention.

FIG. 1 shows a schematic illustration of a first exemplary embodiment of the capacitor 1 according to the invention.

The capacitor 1 comprises a first planar electrode 10 and a second planar electrode 20 positioned opposite it at a distance. The planar electrodes 10, 20 are made of electrically conductive material, such as for example metal. The planar electrodes 10, 20 can be planar in form, and manufactured, for example, from metal sheets. A capacitor structure 3 comprising at least one dielectric 2 is inserted between the first planar electrode 10 and the second planar electrode 20. In the context of the present application, a capacitor structure 3 refers to a structure that can form a capacitor together with the first planar electrode 10 and the second planar electrode 20, or which itself constitutes a capacitor. The capacitor structure 3 can, for example, be a dielectric 2, so that the first planar electrode 10 together with the second planar electrode 20 and the dielectric 2 arranged between the first planar electrode 10 and the second planar electrode 20 form a capacitor. The capacitor structure 3 can, however, also consist of one or more capacitors that are arranged between the first planar electrode 10 and the second planar electrode 20, and which can be connected in parallel or in series, depending on the intended application. Various capacitor technologies, such as for example stacked or cylindrically wound capacitors, can be employed as the capacitors here. These can, for example, make conductive contact with the planar electrodes 10, 20.

The exemplary embodiment illustrated in FIG. 1 of the capacitor 1 according to the invention furthermore comprises a first voltage layer 11 bent at an angle to the first planar electrode 10 and a second voltage layer 12 bent at an angle to the second planar electrode 20. The voltage layers 11, 12 are made of electrically conductive materials and are electrically conductively joined to the respective planar electrodes 10, 20. The first planar electrode 10, is for example made here of the same material as the first voltage layer 11, and formed as one piece with this, and the second planar electrode 20 made, for example, from the same material as the second voltage layer 21, and formed as one piece with this. The planar electrodes 10, 20 can, for example, also however be formed as a composite part of various materials with the respective voltage layers 11, 21. The planar electrodes 10, 20 and the voltage layers 11, 21 are formed in this exemplary embodiment by way of example, as plates. Fundamentally, however, at least slight variations from the plate form may be considered for the planar electrodes 10, 20 and the voltage layers 11, 21. In the exemplary embodiment illustrated, the first planar electrode 10 together with the first voltage layer 11 exhibits in cross-section an L-shaped profile, and the second planar electrode 20, together with the second voltage layer 21 also exhibits in cross-section an L-shaped profile. In principle, the cross-section of the first planar electrode 10 and the first voltage layer 11 and/or the cross-section of the second planar electrode 20 and the second voltage layer 21, can also however exhibit different profiles.

In this exemplary embodiment the first voltage layer 11 and the second voltage layer 21 form an overlap region 4 in which the first voltage layer 11 and the second voltage layer 21 are arranged directly over one another and parallel to one another on the base side 6 of the capacitor 1. The first voltage layer 11 is separated from the second voltage layer 21 in the overlap region 4 by a gap 5. In the context of the present application, an object refers to a voltage layer 11, 21 or a pole terminal 12, 22. If a first object is arranged partially directly underneath or partially directly above a second object, then in the context of the present application this means that the first object and the second object are arranged relative to one another in such a way that a vertical projection of the first object onto a projection plane that is arranged plane-parallel to the second object, and a vertical projection of the second object onto the projection plane exhibit at least one intersection.

Figure 2:
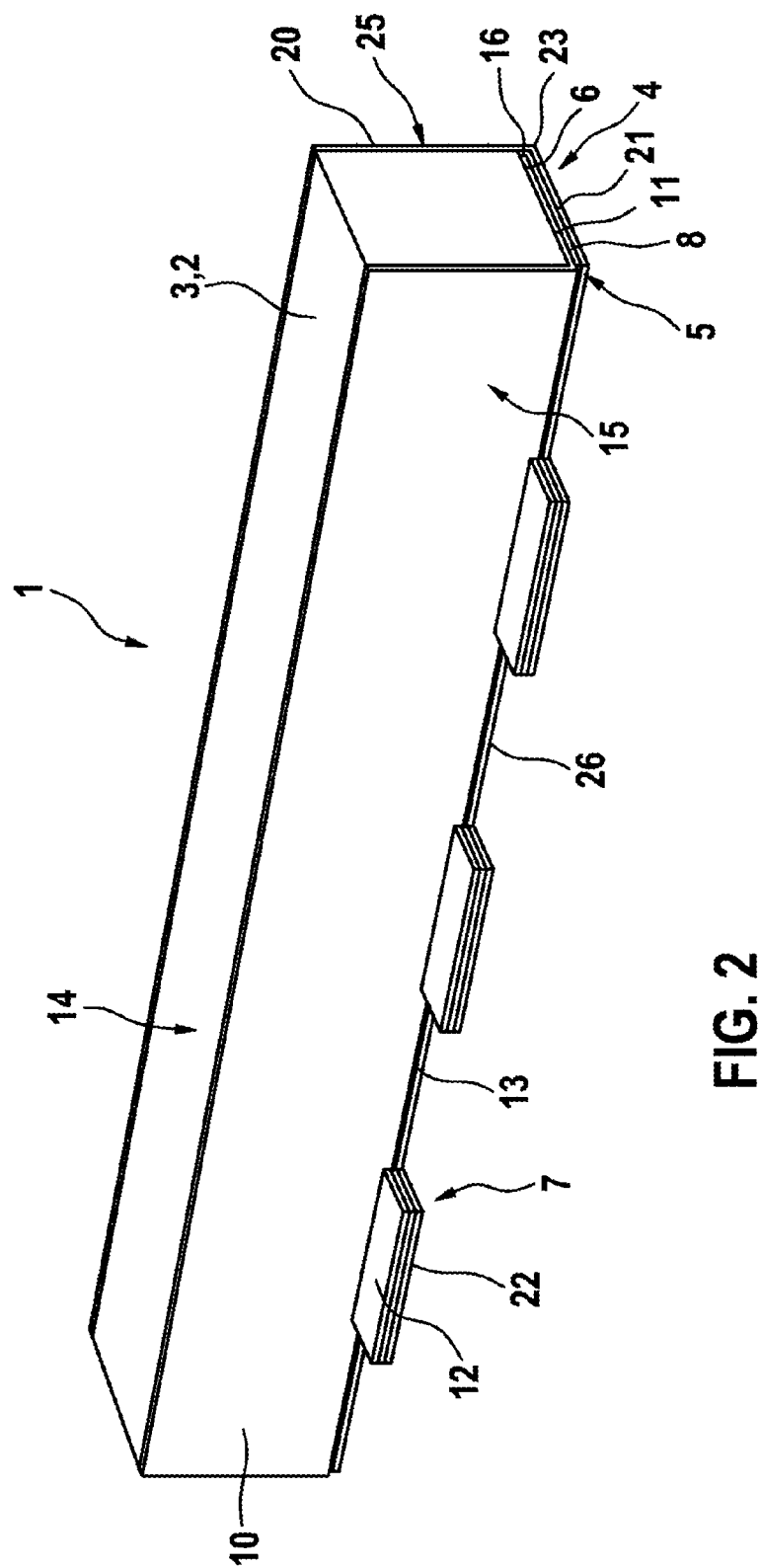
FIG. 2 shows a schematic illustration of the rotated first exemplary embodiment of the capacitor according to the invention of FIG. 1.

As shown in the various views of the first exemplary embodiment in FIG. 1 and FIG. 2, six first pole terminals 12 extend in lateral continuation of the first voltage layer 11 in this exemplary embodiment, wherein in this exemplary embodiment three first pole terminals 12 are arranged thereon at a first edge 13 formed of the first planar electrode 10 and of the first voltage layer 11. In this exemplary embodiment three further pole terminals 12 are arranged on a first margin 16 of the first voltage layer 11 located opposite to the first edge 13 on the first voltage layer 11.

In this exemplary embodiment, six second pole terminals 22 furthermore extend in lateral continuation of the second voltage layer 21, wherein in this exemplary embodiment three of the second pole terminals 22 are arranged thereon at a second edge 23 formed of the second planar electrode 20 and of the second voltage layer 21. Three more of the second pole terminals 22 are arranged on the second voltage layer 21 at a second margin 26 of the second voltage layer 21 located opposite to the second edge 23. In this exemplary embodiment the first pole terminals 12 are formed in the plane of extension of the first voltage layer 11 and the second pole terminals 22 in the plane of extension of the second voltage layer 21. In the context of the present application, plane of extension refers to an imagined plane that contains the first voltage layer 11, the second voltage layer 21, the first planar electrode 10 or the second planar electrode 20, and which extends beyond this in every direction. In this exemplary embodiment, openings 24 that are complementary to the first pole terminals 12 formed on the margin located opposite to the first edge 13 of the first voltage layer 11 are formed in the second planar electrode 20. Thus the first pole terminals 12 formed on the margin located opposite to the first edge 13 of the first voltage layer 11 can protrude through the openings 24 formed in the second planar electrode 20. The first pole terminals 12 exhibit for example the same spatial extension as the second pole terminals 22. They can, however, also for example exhibit different spatial extensions.

Each one first pole terminal 12 forms, together with a second pole terminal 22, a contact lug pair 7. In this exemplary embodiment, three contact lug pairs 7 are arranged at the first edge 13 and three contact lug pairs 7 are arranged at the second edge 23 of the capacitor 1. These contact lug pairs 7 can, however, also for example all be arranged at the first edge 13 of the capacitor 1, or all at the second edge 23 of the capacitor 1. In addition to this however it is also possible for a different number of contact lug pairs 7 to be formed, and for the contact lug pairs 7 to be arranged at different locations of the capacitor 1. In this exemplary embodiment six contact lug pairs 7 are formed for the application of the capacitor 1 as a 6-phase capacitor in an intermediate circuit, wherein each of the six contact lug pairs 7 represents a possibility of making contact with one phase of the 6-phase system. It is also, however, possible for a different number of contact lug pairs 7 to be formed at the capacitor 1. For example, it is possible for a total of three contact lug pairs 7 to be formed for the application as a 3-phase capacitor, or five contact lug pairs for the application as a 5-phase capacitor. The total number of contact lug pairs 7 can also, however, for example be a multiple of three, a multiple of five or a multiple of six.

In this exemplary embodiment, an insulation layer 8 is arranged in the gap 5 between the first voltage layer 11 and the second voltage layer 21. The insulation layer 8 is made of an electrically insulating material, and can, for example, be arranged only in the overlap region 4 between the first voltage layer 11 and the second voltage layer 21. The insulation layer can, however, also extend beyond the overlap region 4 of the first voltage layer 11 and the second voltage layer 21. The insulation layer can, for example, also extend over the intermediate space between the first pole terminal 12 and the second pole terminal 22 respectively forming a contact lug pair 7, and insulate the first pole terminal 12 from the second pole terminal 22. In order to configure the magnetic interaction between the first voltage layer 11 and the second voltage label 21 as effectively as possible, the gap 5 between the voltage layers can be made a small as possible. The insulation layer 8 can thus act as a spacer between the first voltage layer 11 and the second voltage layer 21.

FIG. 3 shows a schematic illustration of the circuit of the phase terminals in the first exemplary embodiment of the capacitor 1 according to the invention. Each pole of a phase 30 of a 6-phase system is here connected electrically to a first pole terminal 12 of a contact lug pair 7, and a second pole of the same phase 30 is electrically connected to a second pole terminal 22 of the same contact lug pair 7. Depending on the number of contact lug pairs 7 formed at the capacitor 1, the capacitor can be used for multi-phase systems, wherein the number of phases 30 that can be connected in the multi-phase system corresponds to the number of contact lug pairs 7.

FIG. 4 shows a second exemplary embodiment of the capacitor 1 according to the invention. In this exemplary embodiment, in contrast to the first exemplary embodiment, 12 contact lug pairs 7 are formed, where six contact lug pairs 7 are formed at the first edge 13 of the capacitor, and a further six contact lug pairs 7 are formed at the second edge 23 of the capacitor 1. Again in this exemplary embodiment, openings 24 are formed in the second planar electrode 20 complementary to the first pole terminals 12 arranged at the first margin 16, such that the first pole terminals 12 formed at the margin 16 positioned opposite to the first edge 13 at the first voltage layer 11 protrude through the openings 24. The openings 24 are here formed for example complementary to the first pole terminals in such a way that the first pole terminals are not in direct contact with the second planar electrode 20, the second voltage layer 21 and the second pole terminals 22 of the second voltage layer 21. The second exemplary embodiment of the capacitor according to the invention illustrated in FIG. 3 can, for example, be employed in an intermediate circuit of 12-phase systems as a 12-phase intermediate circuit capacitor.

FIG. 5 shows an illustration of an exemplary embodiment of a pole terminal 12, 22. In this exemplary embodiment, contact tabs 9 are formed at the first pole terminal 12 and the second pole terminal 22 that constitute the contact lug pair 7. Two contact tabs 9 are, for example, formed at each pole terminal 12, 22, and are, for example, arranged offset with respect one another. It is, however, for example also possible for only one contact tab 9 or for several contact tabs 9 to be formed.

Further exemplary embodiments and mixed forms of the illustrated exemplary embodiments are, of course, also possible.

What is claimed is:
1. A capacitor (1) comprising:
  a first planar electrode (10) and a second planar electrode (20) located opposite the first planar electrode at a distance, at least one capacitor structure (3) comprising at least one dielectric (2) between the first planar electrode (10) and second planar electrode (20), a first voltage layer (11) bent at an angle to the first planar electrode (10) and a second voltage layer (21) bent at an angle to the second planar electrode (20), and at least one first pole terminal (12) contacting the first voltage layer (11) and at least one second pole terminal (22) contacting the second voltage layer (21), wherein the first voltage layer (11) and the second voltage layer (21) of the capacitor (1) form an overlap region (4) in which the first voltage layer (11) and the second voltage layer (21) are arranged parallel to one another, separated by a gap (5), on a base side (6) of the capacitor (1), directly above one another, wherein the at least one first pole terminal (12) extends in lateral continuation of the first voltage layer (11) and, in parallel with this, the at least one second pole terminal (22) extends in lateral continuation of the second voltage layer (21) over and beyond the overlap region (4), so as to form at least one contact lug pair (7) protruding from the base side (6) of the capacitor (1), wherein at least one opening (24) complimentary to the at least one first pole terminal (12) is formed in at least one of the second planar electrode (20) and the second voltage layer (21) and the at least one first pole terminal (12) protrudes through the opening (24), and wherein the at least one second pole terminal (22) is formed at an edge (23) formed by the second planar electrode (20) and the second voltage layer (21).

2. The capacitor according to claim 1, characterized in that the first planar electrode (10) and second planar electrode (20) and the voltage layers (11, 12) arranged directly above one another at the base side (6) of the capacitor (1) form in cross-section an enclosure (14) for the inserted capacitor structure (3).

3. The capacitor according to claim 1, characterized in that the at least one first pole terminal (12) is formed at a first edge (13) formed by the first planar electrode (10) and the first voltage layer (11).

4. The capacitor according to claim 1, characterized in that the first planar electrode (10) together with the first voltage layer (11) exhibits in cross-section a first L-shaped profile (15).

5. The capacitor according to claim 1, characterized in that the at least one first pole terminal (12) is arranged at least partially directly above the at least one second pole terminal (22).

6. The capacitor according to claim 1, characterized in that the at least one first pole terminal (12) and the at least one second pole terminal (22) have the same surface area.

7. The capacitor according to claim 1, characterized in that the at least one first pole terminal (12) is formed in a plane of extension of the first planar electrode (10) or in a plane of extension of the second voltage layer (11).

8. The capacitor according to claim 1, characterized in that, apart from the at least one first pole terminal (12) and the at least one second pole terminal (22), further pole terminals (12, 22) of the same type are provided, which form in respective pairs a further contact lug pair (7).

9. The capacitor according to claim 1, characterized in that an insulation layer (8) is arranged in the gap (5).

10. The capacitor according to claim 1, characterized in that at least one contact tab (9) is formed at at least one of the first pole terminal (12) and the second pole terminal (22).

11. The capacitor according to claim 1, characterized in that the at least one opening (24) complimentary to the at least one first pole terminal (12) is formed in both of the second planar electrode (20) and the second voltage layer (21).

12. The capacitor according to claim 1, characterized in that the second planar electrode (20) together with the second voltage layer (21) exhibits in cross-section a second L-shaped profile (25).

13. The capacitor according to claim 1, characterized in that the at least one first pole terminal (12) is arranged at least partially directly underneath the at least one second pole terminal (22).

14. The capacitor according to claim 1, characterized in that the at least one second pole terminal (22) is formed in a plane of extension of the second planar electrode (20) or in a planar extension of the second voltage layer (21).

15. The capacitor according to claim 1, characterized in that, apart from the at least one first pole terminal (12) and the at least one second pole terminal (22), further pole terminals (12, 22) of the same type are provided, which form in respective pairs a further contact lug pair (7), wherein the total number of pole terminals (12, 22) is a multiple of three, five or six.

16. The capacitor according to claim 1, characterized in that at least one contact tab (9) is formed at both of the first pole terminal (12) and the second pole terminal (22).

17. The capacitor according to claim 1, characterized in that the first planar electrode (10) together with the first voltage layer (11) exhibits in cross-section a first L-shaped profile (15), and that the second planar electrode (20) together with the second voltage layer (21) exhibits in cross-section a second L-shaped profile (25).

18. The capacitor according to claim 1, characterized in that the at least one first pole terminal (12) is formed in a plane of extension of the first planar electrode (10) or in a plane of extension of the second voltage layer (11) and that the at least one second pole terminal (22) is formed in a plane of extension of the second planar electrode (20) or in a planar extension of the second voltage layer (21).

* * * * *